(12) United States Patent
Tsunashima

(10) Patent No.: US 10,319,099 B2
(45) Date of Patent: Jun. 11, 2019

(54) IMAGE PROCESSING APPARATUS, IMAGE PROCESSING METHOD, AND IMAGE PROCESSING SYSTEM

(71) Applicant: SONY CORPORATION, Tokyo (JP)

(72) Inventor: Nobuhiro Tsunashima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 17 days.

(21) Appl. No.: 15/542,685

(22) PCT Filed: Apr. 4, 2016

(86) PCT No.: PCT/JP2016/001897
§ 371 (c)(1),
(2) Date: Jul. 11, 2017

(87) PCT Pub. No.: WO2016/166950
PCT Pub. Date: Oct. 20, 2016

(65) Prior Publication Data
US 2017/0372485 A1 Dec. 28, 2017

(30) Foreign Application Priority Data
Apr. 14, 2015 (JP) ................................ 2015-082275

(51) Int. Cl.
G06K 9/00 (2006.01)
G06T 7/20 (2017.01)
G06T 7/254 (2017.01)

(52) U.S. Cl.
CPC .......... *G06T 7/254* (2017.01); *G06K 9/00335* (2013.01); *G06K 9/00771* (2013.01); *G06T 7/20* (2013.01); *G06T 2207/30232* (2013.01)

(58) Field of Classification Search
CPC .. G06K 9/00335; G06K 9/00771; G06T 7/20; G06T 7/254; G06T 2207/30232
See application file for complete search history.

(56) References Cited

U.S. PATENT DOCUMENTS 8,248,474 B2 * 8/2012 Lee .................... G06K 9/00221
348/159
8,724,928 B2 * 5/2014 Deever ................ G06T 3/4076
382/299

(Continued)

FOREIGN PATENT DOCUMENTS

EP 2 981 075 A1 3/2016
JP 2001-333422 A 11/2001

(Continued)

OTHER PUBLICATIONS

Siebel, N. T., et al. (2002) "Fusion of Multiple Tracking Algorithms for Robust People Tracking", Correct System Design, vol. 2353, (15 pages), XP055287552.

(Continued)

*Primary Examiner* — Katrina R Fujita
(74) *Attorney, Agent, or Firm* — Oblon, McClelland, Maier & Neustadt, L.L.P.

(57) ABSTRACT

An information processing apparatus, including circuitry configured to generate or receive a first image of a sequence of images including an object. The circuitry is configured to determine a length of time movement of the object is below a predetermined movement threshold. The circuitry is further configured to identify the object as a target object based on the determined length of time the movement of the object is below the predetermined movement threshold.

20 Claims, 11 Drawing Sheets

(56) References Cited

U.S. PATENT DOCUMENTS

| | | | |
|---|---|---|---|
| 8,879,789 B1 | 11/2014 | Figov et al. | |
| 2005/0117778 A1 | 6/2005 | Crabtree | |
| 2006/0227997 A1* | 10/2006 | Au | G06K 9/00771 |
| | | | 382/103 |
| 2007/0122002 A1 | 5/2007 | Crabtree | |
| 2009/0097706 A1 | 4/2009 | Crabtree | |
| 2009/0244390 A1 | 10/2009 | Feris et al. | |
| 2010/0289904 A1* | 11/2010 | Zhang | H04N 7/147 |
| | | | 348/207.1 |
| 2011/0007175 A1* | 1/2011 | Fujita | G03B 5/00 |
| | | | 348/222.1 |
| 2012/0062732 A1* | 3/2012 | Marman | H04N 7/18 |
| | | | 348/142 |
| 2012/0320269 A1 | 12/2012 | Feris et al. | |
| 2014/0072234 A1* | 3/2014 | Puri | G06K 9/00221 |
| | | | 382/201 |
| 2014/0257943 A1 | 9/2014 | Nerayoff et al. | |
| 2015/0010209 A1 | 1/2015 | Feris et al. | |
| 2015/0010210 A1 | 1/2015 | Feris et al. | |
| 2015/0010211 A1 | 1/2015 | Feris et al. | |
| 2015/0287213 A1 | 10/2015 | Feris et al. | |
| 2015/0310630 A1 | 10/2015 | Feris et al. | |
| 2015/0310631 A1 | 10/2015 | Feris et al. | |
| 2015/0347859 A1* | 12/2015 | Dixon | G06K 9/186 |
| | | | 382/138 |
| 2015/0347860 A1* | 12/2015 | Meier | G06K 9/72 |
| | | | 382/140 |
| 2015/0347861 A1* | 12/2015 | Doepke | H04N 5/23245 |
| | | | 382/199 |
| 2015/0371403 A1 | 12/2015 | Koyama et al. | |
| 2017/0200068 A1* | 7/2017 | Cohen | G06K 9/00979 |

FOREIGN PATENT DOCUMENTS

| | | |
|---|---|---|
| JP | 2004-334587 A | 11/2004 |
| JP | 2014-222825 A | 11/2014 |
| WO | 2014/155922 A1 | 10/2014 |

OTHER PUBLICATIONS

International Search Report dated Jul. 22, 2016 in PCT/JP2016/001897 filed Apr. 4, 2016.

* cited by examiner

[Fig. 1]
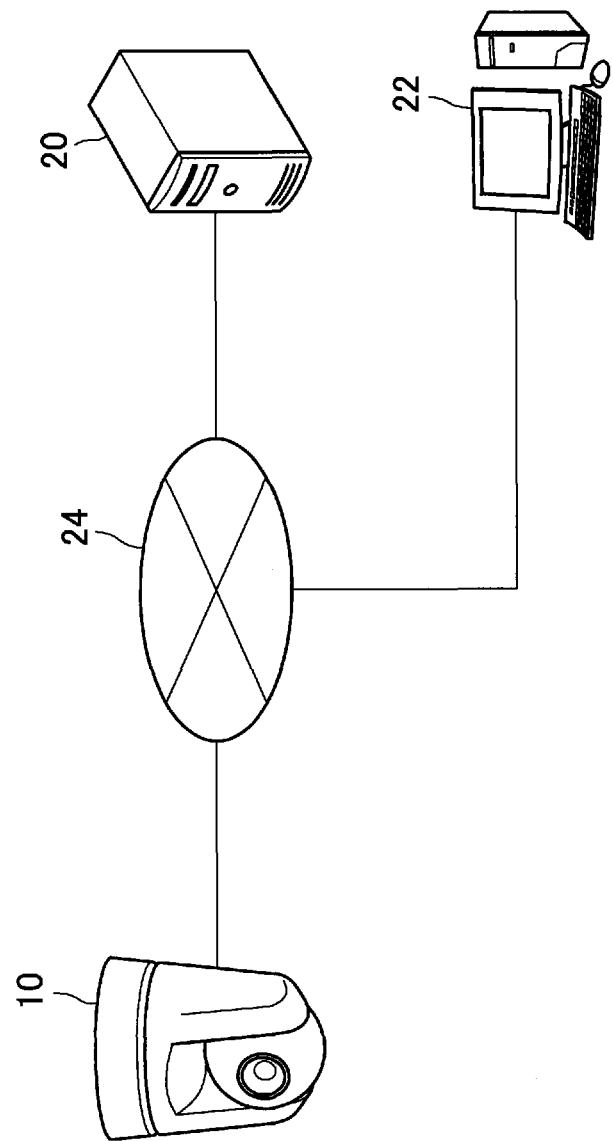

[Fig. 2]
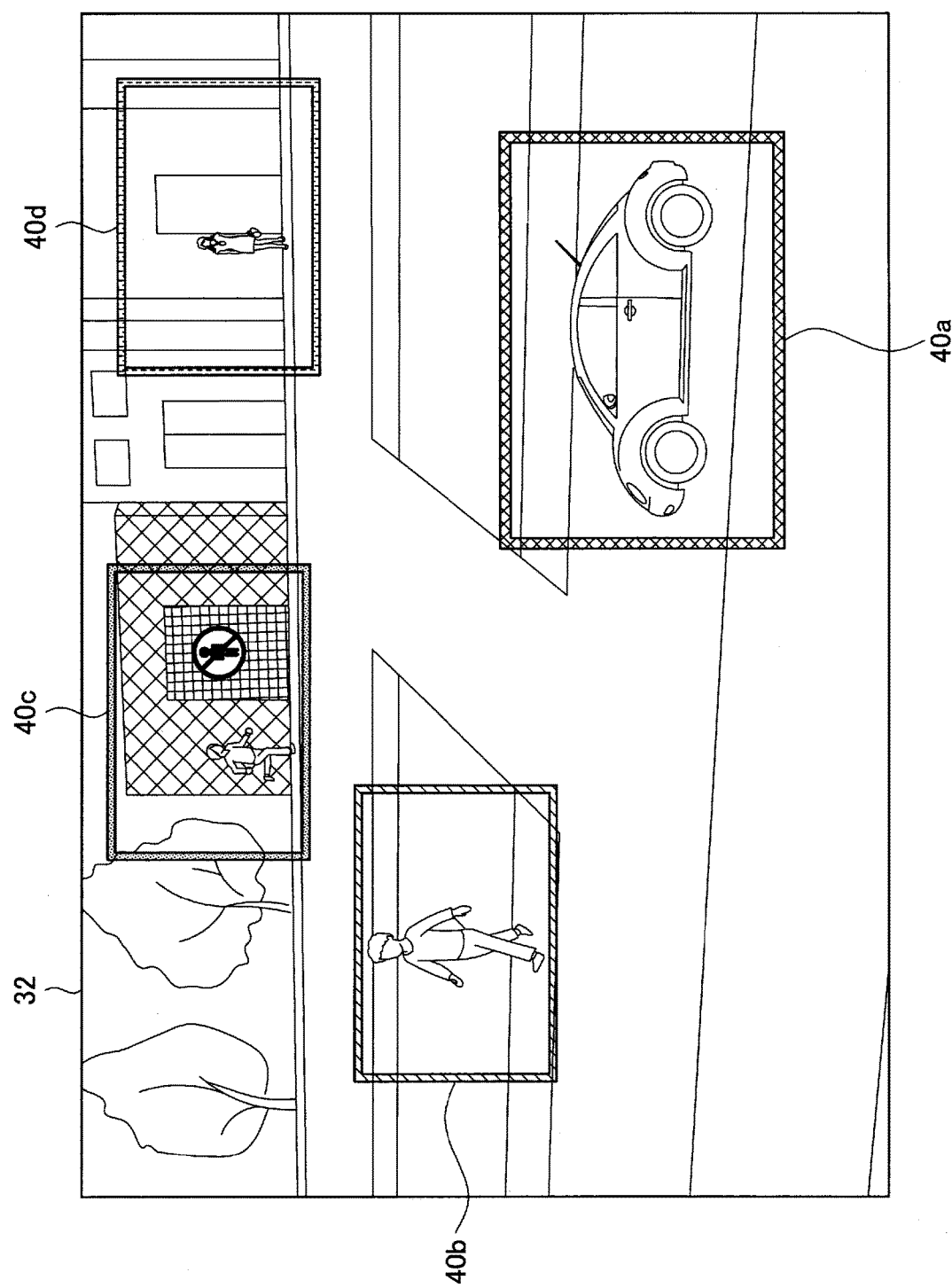

[Fig. 3]
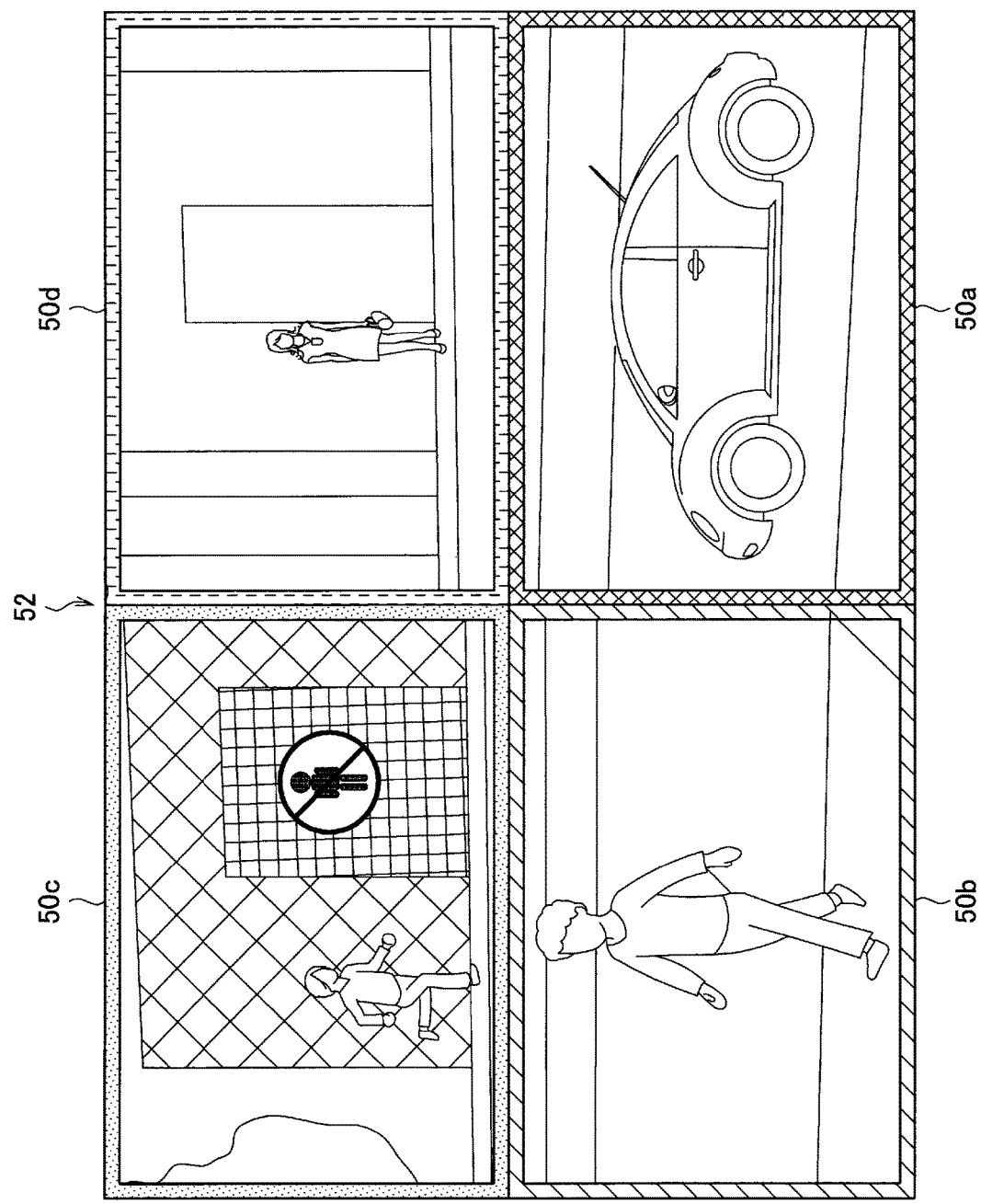

[Fig. 4]
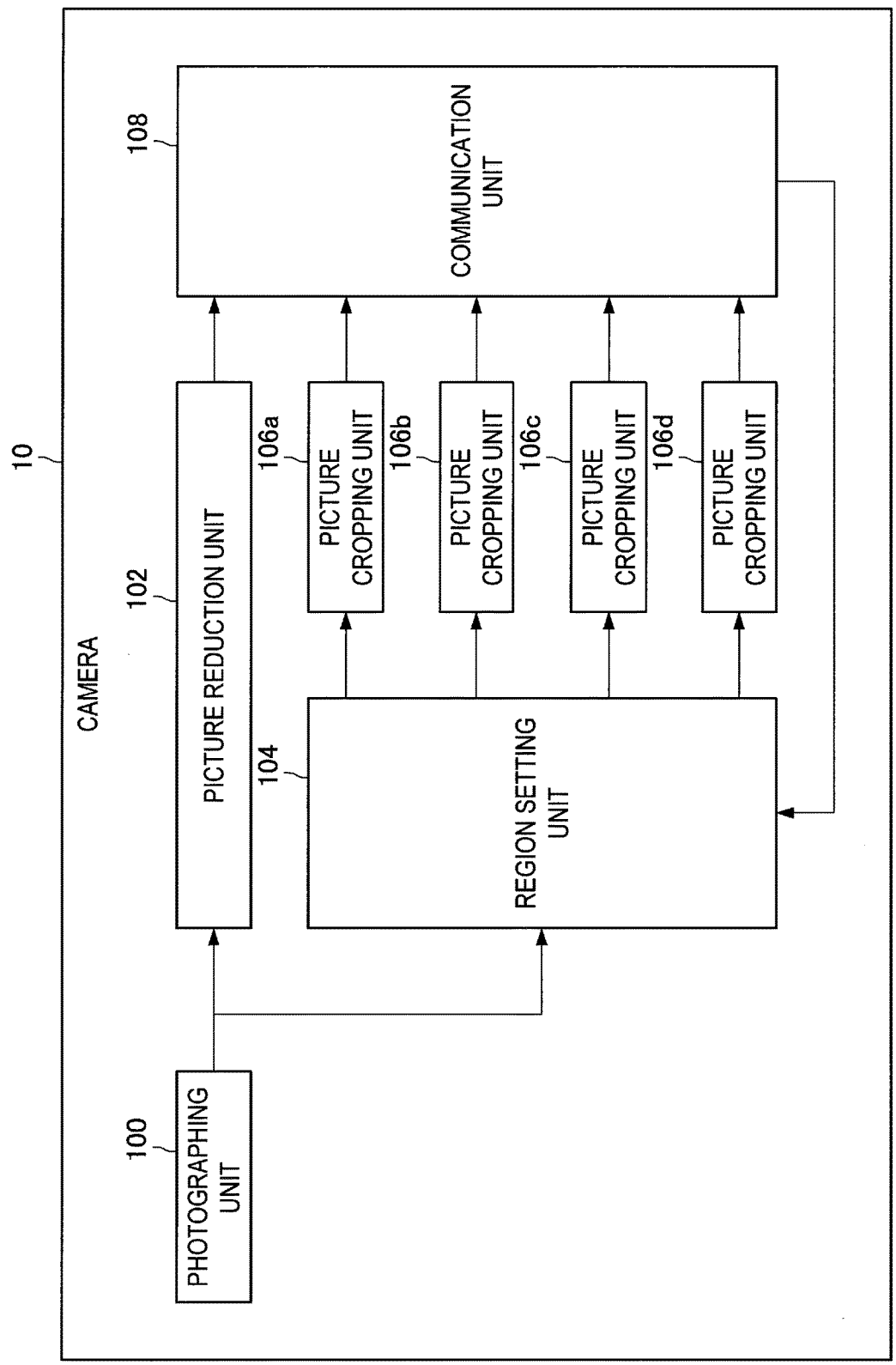

[Fig. 5]
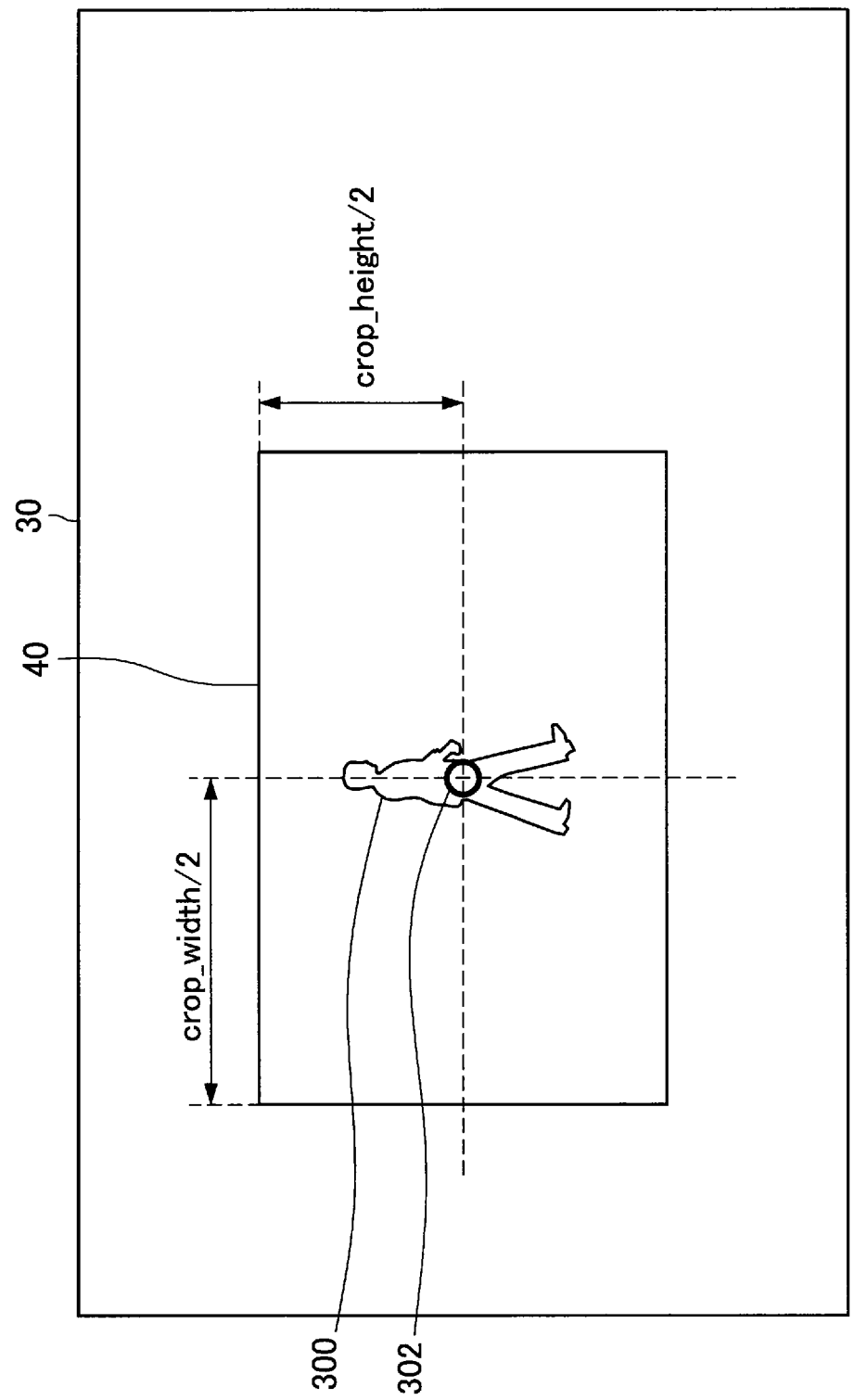

[Fig. 6]
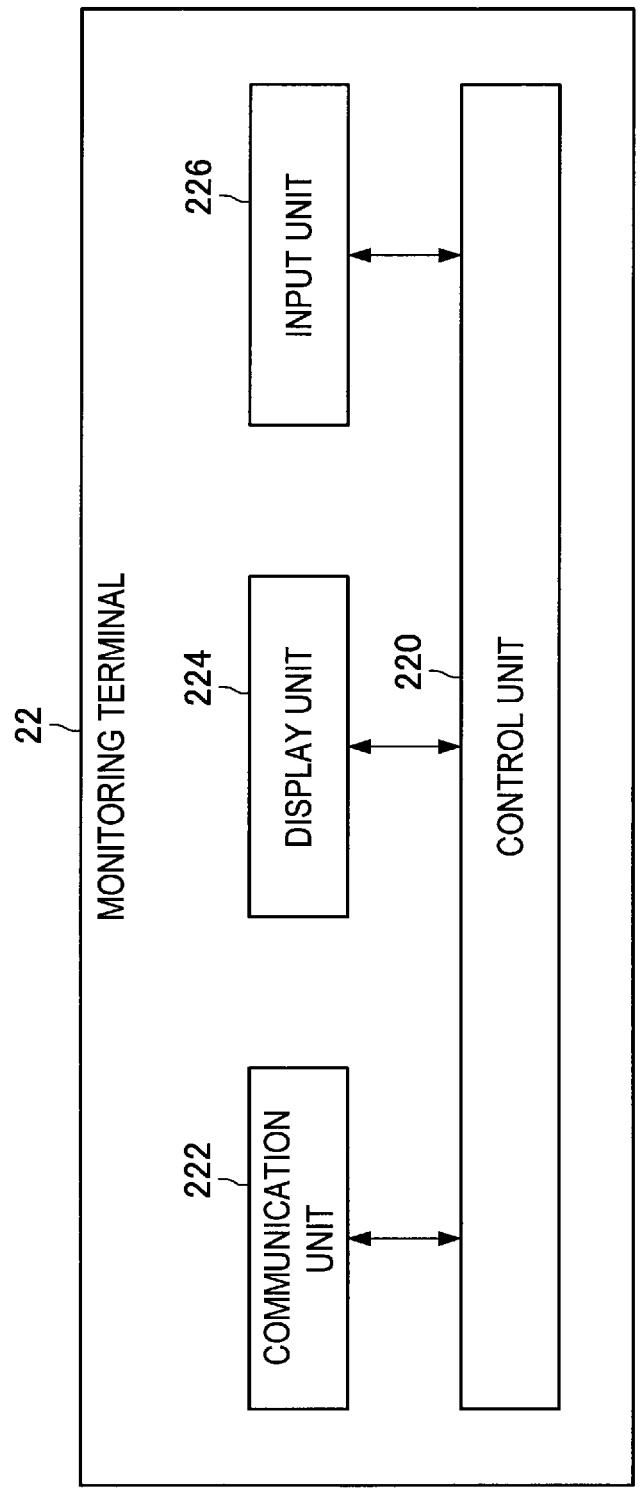

[Fig. 7]
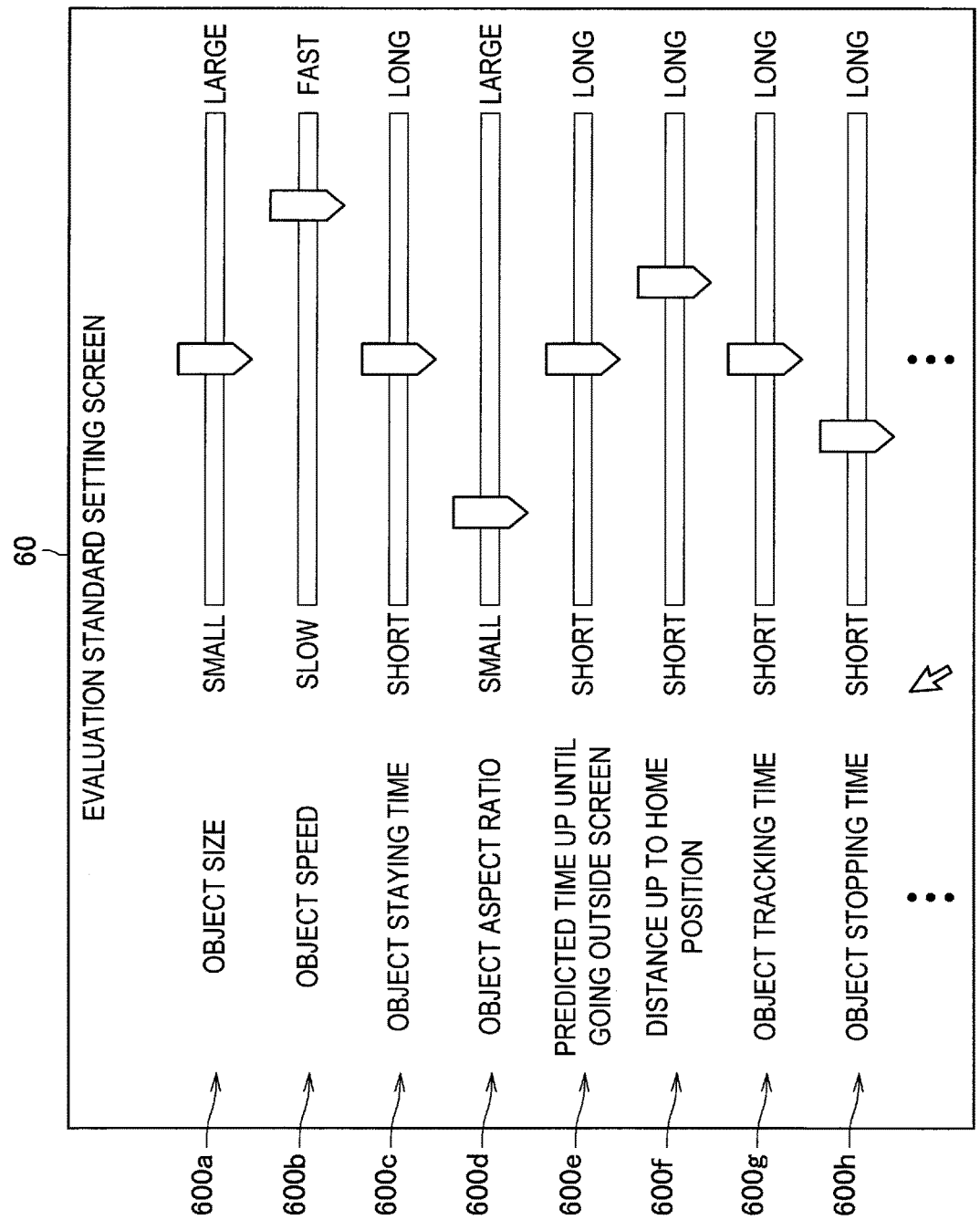

[Fig. 8]
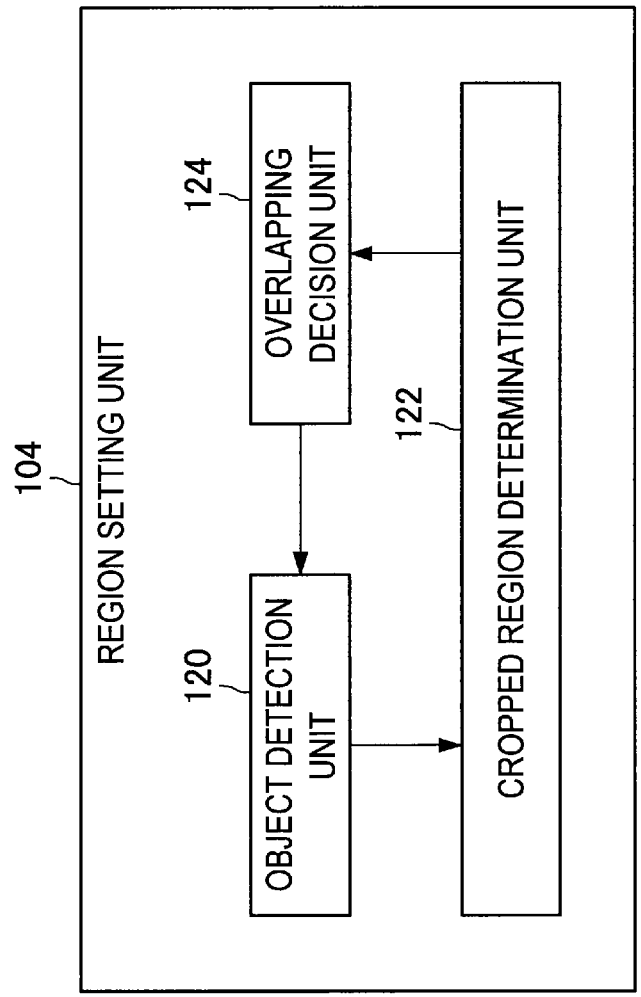

[Fig. 9]
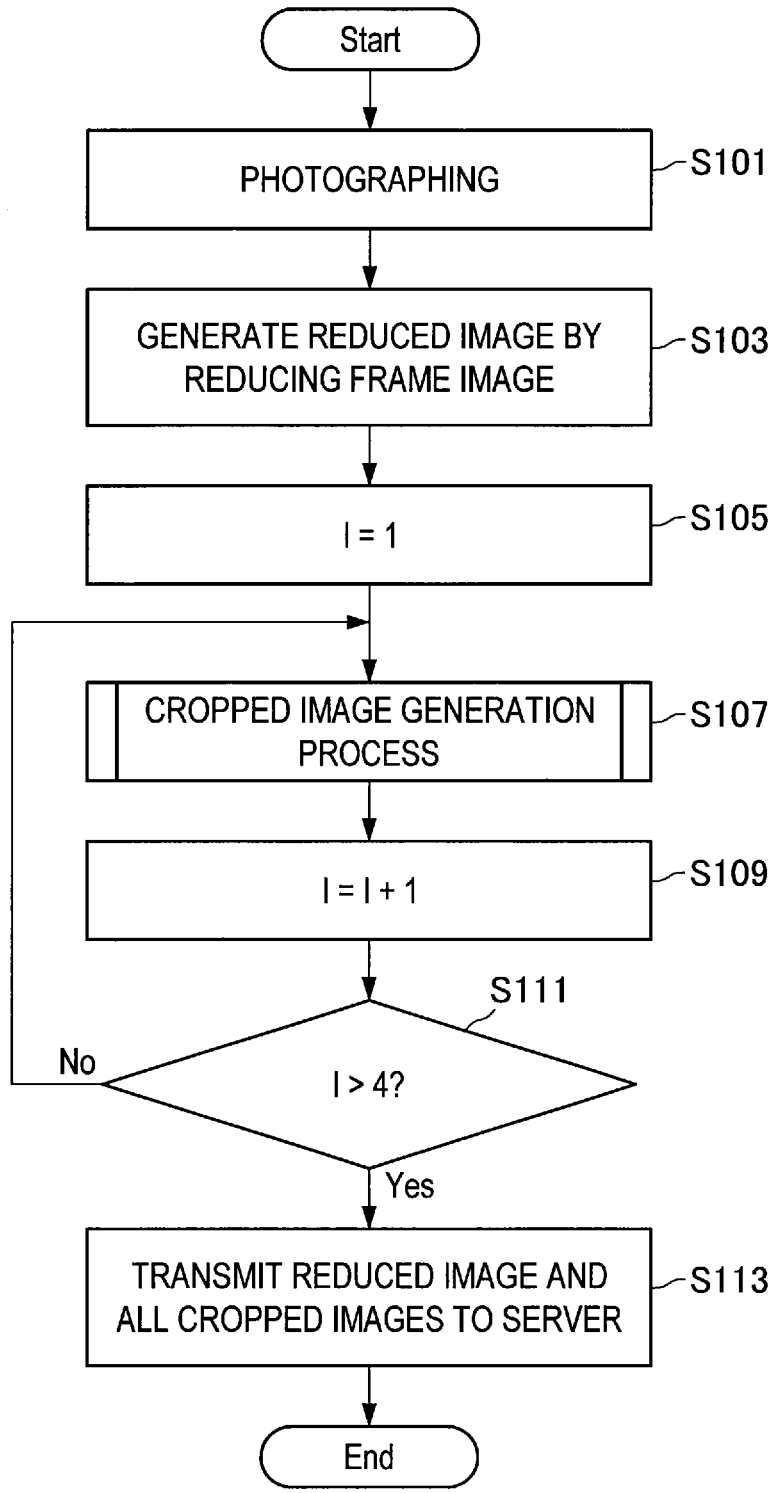

[Fig. 10]
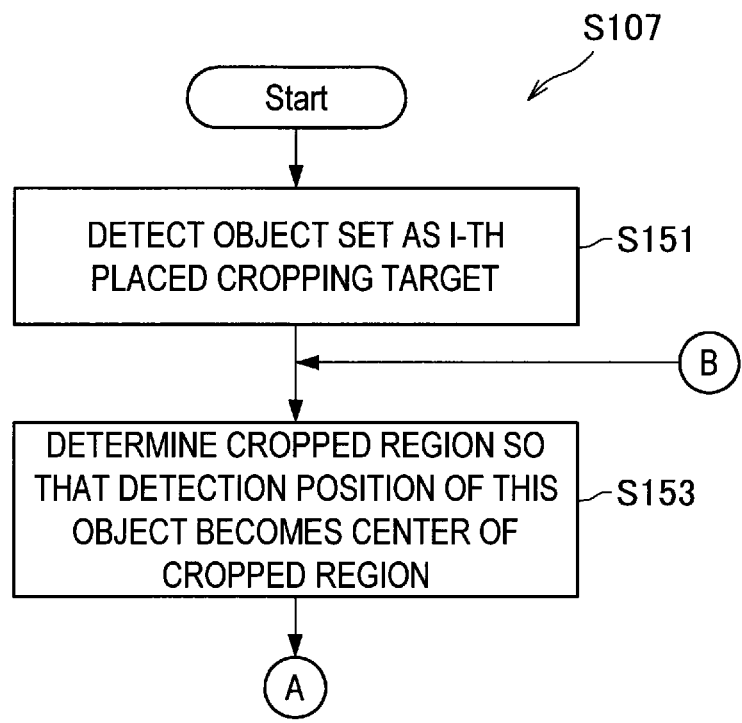

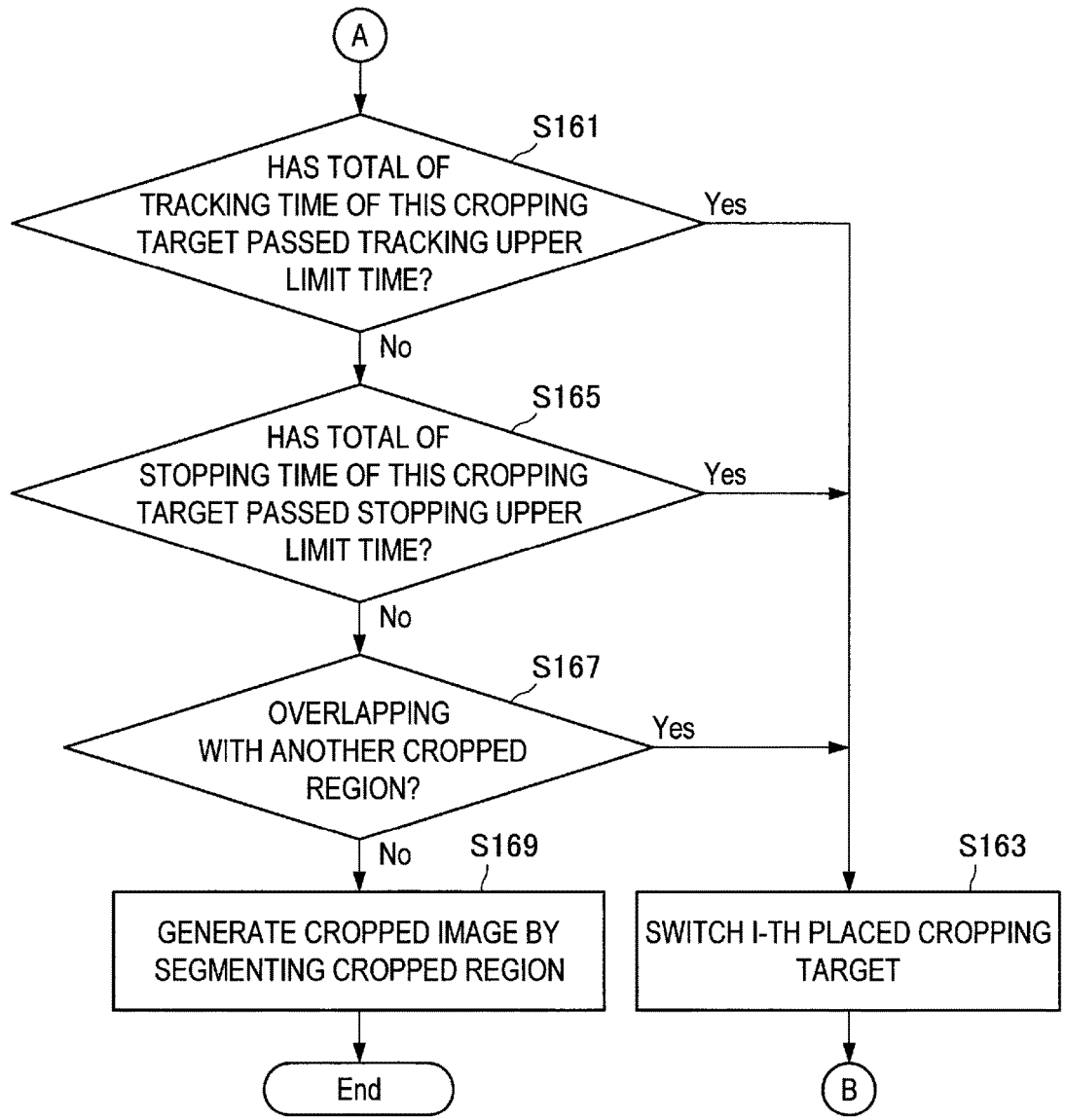
[Fig. 11]

IMAGE PROCESSING APPARATUS, IMAGE PROCESSING METHOD, AND IMAGE PROCESSING SYSTEM

CROSS REFERENCE TO RELATED APPLICATIONS

This application claims the benefit of Japanese Priority Patent Application JP 2015-082275 filed Apr. 14, 2015, the entire contents of which are incorporated herein by reference.

TECHNICAL FIELD

The present disclosure relates to an image processing apparatus, an image processing method, and an image processing system.

BACKGROUND ART

In related art, technology for segmenting a region of an object such as a person of a detection target, within a photographed image, has been variously developed.

For example, PTL 1 discloses technology that detects moving bodies within an image photographed by a fish-eye lens camera, and respectively segments circumscribed quadrangle regions of each of the detected moving bodies. Further, PTL 2 discloses technology that extracts, based on position information of a partial region extracted with an immediately preceding frame image, and a physical feature amount analyzed from a present frame image, a partial region from each frame image. Further, PTL 3 discloses technology that detects a moving body with a size, an existing time, or a moving speed the largest from among moving bodies extracted from picture data, and segments a region that includes the detected moving body.

CITATION LIST

Patent Literature

PTL 1: JP 2001-333422A
PTL 2: JP 2004-334587A
PTL 3: JP 2014-222825A

SUMMARY

Technical Problem

However, in the technology disclosed in PTL 1 to PTL 3, there will be cases where the position of a segmented region is restricted. For example, in the technology disclosed in PTL 3, when an object determined once to be a detection target continues to be positioned at the same location, the same location will continue to be set for a long time as a segmented region.

Accordingly, the present disclosure proposes a new and improved image processing apparatus, image processing method, and image processing system, capable of adaptively determining a segmented region for the length of time that an object of a detection target is stopped.

Solution to Problem

According to an embodiment of the present disclosure, there is provided an image processing apparatus, including circuitry configured to generate or receive a first image of a sequence of images including an object. The circuitry is configured to determine a length of time movement of the object is below a predetermined movement threshold. The circuitry is further configured to identify the object as a target object based on the determined length of time the movement of the object is below the predetermined movement threshold.

According to an embodiment of the present disclosure, there is provided a method of an information processing apparatus for identifying a target object. The method includes generating or receiving a first image of a sequence of images including an object. A length of time movement of the object is below the predetermined movement threshold is determined by circuitry of the information processing apparatus. Further, the method includes identifying, by the circuitry, the object as the target object based on the determined length of time the movement of the object is below the predetermined movement threshold.

According to an embodiment of the present disclosure, there is provided a non-transitory computer-readable medium storing instructions which when executed by a computer cause the computer to perform a method of an information processing apparatus for identifying a target object. The method includes generating or receiving a first image of a sequence of images including an object. A length of time movement of the object is below the predetermined movement threshold is determined. The method further includes identifying the object as the target object based on the determined length of time the movement of the object is below the predetermined movement threshold.

Advantageous Effects of Invention

According to an embodiment of the present disclosure such as described above, a segmented region can be adaptively determined for the length of time that an object of a detection target is stopped. Note that, the effect described here is not necessarily limited, and may be any of the effects described within the present disclosure.

BRIEF DESCRIPTION OF DRAWINGS

FIG. 1 is an explanatory diagram that shows a configuration example of an image processing system according to an embodiment of the present disclosure.

FIG. 2 is an explanatory diagram that shows an example of a reduced image 32 generated by a camera 10.

FIG. 3 is an explanatory diagram that shows an example of a plurality of cropped images 50 generated from a frame image 30.

FIG. 4 is a function block diagram that shows a configuration of the camera 10 according to a same embodiment.

FIG. 5 is an explanatory diagram that shows a relationship between the frame image 30 and a cropped region 40.

FIG. 6 is a function block diagram that shows a configuration of a monitoring terminal 22 according to a same embodiment.

FIG. 7 is an explanatory diagram that shows a display example of an evaluation standard setting screen according to a same embodiment.

FIG. 8 is a function block diagram that shows a configuration of a region setting unit 104 according to a same embodiment.

FIG. 9 is a flow chart that shows the operations according to a same embodiment.

FIG. 10 is a flow chart that shows a part of the operations of a cropped image generation process according to a same embodiment.

FIG. 11 is a flow chart that shows a part of the operations of a cropped image generation process according to a same embodiment.

DESCRIPTION OF EMBODIMENTS

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, in the present description and drawings, there will be cases where a plurality of structural elements having substantially the same function configuration are distinguished from each other by attaching different letters of the alphabet after the same reference sign. For example, a plurality of configurations having substantially the same function configuration will be distinguished such as a picture cropping unit 106*a* and a picture cropping unit 106*b* as necessary. However, in the case where it may not be necessary to distinguish structural elements having substantially the same function configuration, only the same reference sign will be attached. For example, in the case where it may not be necessary to distinguish the picture cropping unit 106*a* and the picture cropping unit 106*b*, they will be simply called a picture cropping unit 106.

Further, the "Description of Embodiments" will be described according to the order of items shown below.
1. Basic Configuration of the Image Processing System
2. Detailed Description of the Embodiments
3. Modifications <<1. Basic Configuration of the Image Processing System>>

The present disclosure can be implemented by various modes, such as described in detail in "2. Detailed description of the embodiments" as an example. Firstly, the basic configuration of an image processing system according to the present embodiment will be described by referring to FIG. 1.

As shown in FIG. 1, an image processing system according to the present embodiment includes a camera 10, a storage 20, a monitoring terminal 22, and a communication network 24.

<1-1. Camera 10>

The camera 10 is an example of an image processing apparatus in an embodiment of the present disclosure. The camera 10 is an apparatus for photographing a moving image of an external environment. This camera 10 can be set at a location where there are many people or a large amount of vehicle traffic, a location of a monitoring target or the like. For example, the camera 10 may be set at a road, a train station, an airport, a commercial building, an amusement park, a park, a parking lot, a restricted area or the like.

Further, it is possible for the camera 10 to generate another image by using a photographed frame image, and to transmit the generated other image to another apparatus via the communication network 24, which will be described below. Here, the frame image is, for example, an image having a resolution with an upper limit that the camera 10 is capable of photographing. As an example, the frame image may be a 4K image.

For example, the camera 10 generates another image with a small amount of data based on the frame image. The reason for this is that since the frame image has a large amount of data, it is not desirable to transmit the frame image itself to another apparatus, for example, due to a reason such as taking time to transfer.

Here, an example of another image generated by the camera 10 is a reduced image, which is an image where the resolution of the frame image is simply lowered, or a cropped image, which is an image where a region of an attention target is cropped (cut out). Note that, the reduced image may be, for example, an HD image.

FIG. 2 is an explanatory diagram that shows an example of a reduced image (reduced image 32). The reduced image 32 includes all the regions included in a frame image. On the other hand, since a region of an attention target, such as a person's face, for example, can become extremely small in the reduced image 32, such as shown in FIG. 2, it can become difficult to visually recognize. Note that, regions 40 shown in FIG. 2 are regions corresponding to cropped regions, which will be described below. Ordinarily, while cropped regions are set within a frame image, in FIG. 2, for the sake of convenience of the description, the regions corresponding to cropped regions will be described as regions 40 in the reduced image 32.

Further, FIG. 3 is an explanatory diagram that shows an example of a plurality of cropped images (a set 52 of cropped images 50) generated from one frame image. While the cropped images 50 have a resolution the same as that of the frame image, each of the cropped images 50 only include a part of the region within the frame image, such as shown in FIG. 3. Accordingly, the camera 10 according to the present embodiment basically generates one reduced image, and one or more cropped images, from one frame image. According to this generation example, a user can confirm a full view photographed by the camera 10, and a user can confirm a region of an attention target with a high resolution. Also, the total data amount can be suppressed compared to that of the frame image.

Here, an internal configuration of the camera 10 will be described by referring to FIG. 4. As shown in FIG. 4, the camera 10 includes a photographing unit 100, a picture reduction unit 102, a region setting unit 104, a plurality of picture cropping units 106, and a communication unit 108. Note that, while an example is shown in FIG. 4 where four picture cropping units 106 are included, it is not limited to such an example, and may include an arbitrary number of one or more.

{1-1-1. Photographing Unit 100}

The photographing unit 100 has a function that acquires a frame image, by forming an external picture on an imaging element such as a Charge Coupled Device (CCD) or a Complementary Metal Oxide Semiconductor (CMOS), for example, through a lens. For example, the photographing unit 100 acquires a frame image, by photographing an external picture for each prescribed frame rate.

{1-1-2. Picture Reduction Unit 102}

The picture reduction unit 102 generates a reduced image by reducing the frame image acquired by the photographing unit 100 to a prescribed size.

{1-1-3. Region Setting Unit 104}

The region setting unit 104 sets cropped regions, which are regions that become a generation source of cropped images, in the frame image acquired by the photographing unit 100. For example, the region setting unit 104 sets cropped regions only of the number of picture cropping units 106 included in the camera 10, from the frame image acquired by the photographing unit 100.

FIG. 5 is an explanatory diagram that shows a setting example of a cropped region by the region setting unit 104. Note that, in FIG. 5, the length of a horizontal width of the cropped region 40 is described as "crop_width", and the length of a vertical width of the cropped region 40 is described as "crop_height".

As shown in FIG. 5, the region setting unit 104 detects an object of a detection target such as a person 300 from within the frame image 30, and sets the cropped region 40 based on a detection position 302 of the object.

{1-1-4. Picture Cropping Unit 106}

The picture cropping unit 106 is an example of a segmented image generation unit in an embodiment of the present disclosure. The picture cropping unit 106 generates a cropped image by segmenting the cropped region set by the region setting unit 104 from the frame image acquired by the photographing unit 100.

For example, in the example shown in FIG. 3, four cropped images 50 generated by each of the four picture cropping units 106 are shown. As shown in FIG. 3, for example, the picture cropping unit 106a generates a cropped image 50a from a cropped region corresponding to the region 40a shown in FIG. 2, set by the region setting unit 104. Further, the picture cropping unit 106b generates a cropped image 50b from a cropped region corresponding to the region 40b shown in FIG. 2, set by the region setting unit 104.

{1-1-5. Communication Unit 108}

The communication unit 108 is an example of an acquisition unit according to the present embodiment. The communication unit 108 performs transmission and reception of various types of information between apparatuses connected to the communication network 24, via the communication network 24, which will be described below. For example, the communication unit 108 transmits, to the storage 20, the reduced image acquired by the picture reduction unit 102, and the plurality of cropped images generated by the plurality of picture cropping units 106. Further, the communication unit 108 receives, from the monitoring terminal 22, detection specification information for selecting a cropping target, set by a user.

Note that, detection specification information may be stored from the beginning by the camera 10, instead of being received from the monitoring terminal 22. Hereinafter, a description will be made by centering on an example where detection specification information is received from the monitoring terminal 22.

<1-2. Storage 20>

The storage 20 is a storage apparatus for storing the reduced image and cropped images received from the camera 10. For example, the storage 20 associates and stores identification information of the camera 10, and at the time of photographing, the received reduced image, and the received plurality of cropped images. Note that, the storage 20 can be set, for example, to a data center, a monitoring center where monitoring staff are employed or the like.

<1-3. Monitoring Terminal 22>

The monitoring terminal 22 is an information processing terminal for displaying the reduced image and cropped images generated by the camera 10. This monitoring terminal 22 can be set, for example, in a monitoring center, and can be used by monitoring staff.

Here, a configuration of the monitoring terminal 22 will be described in detail. FIG. 6 is a function block diagram that shows a configuration of the monitoring terminal 22 according to the present embodiment. As shown in FIG. 6, the monitoring terminal 22 has a control unit 220, a communication unit 222, a display unit 224, and an input unit 226.

{1-3-1. Control Unit 220}

The control unit 220 generally controls the operations of the monitoring terminal 22, by using hardware such as a Central Processing Unit (CPU), a Random Access Memory (RAM), and a Read Only Memory (ROM) built into the monitoring terminal 22.

{1-3-2. Communication Unit 222}

The communication unit 222 performs transmission and reception of various types of information between apparatuses connected to the communication network 24, via the communication network 24, which will be described below. For example, the communication unit 222 receives, from the storage 20, the reduced image and cropped images stored in the storage 20. Note that, it is possible for the communication unit 222 to directly receive, from the camera 10, the reduced image and plurality of cropped images generated by the camera 10.

Further, the communication unit 222 transmits, to the camera 10, detection specification information for selecting an object of a cropping target, input by a user on an evaluation standard setting screen, which will be described below, in accordance with a control of the control unit 220.

{1-3-3. Display Unit 224}

The display unit 224 is constituted, for example, by a display such as a Liquid Crystal Display (LCD), or an Organic Light Emitting Diode (OLED). This display unit 224 displays, for example, a monitoring screen that includes the reduced image or cropped images received from the storage 20.

Further, the display unit 224 displays an evaluation standard setting screen, in accordance with a control of the control unit 220. This evaluation standard setting screen is a screen for a user to set (or change) detection specification information used for determining an object of a cropping target from within a frame image photographed by the camera 10. For example, detection specification information is set so as to include one or more evaluation items selected on the evaluation standard setting screen, and evaluation standards of these evaluation items.

Here, a display example of the evaluation standard setting screen (an evaluation standard setting screen 60) will be described by referring to FIG. 7. As shown in FIG. 7, the evaluation standard setting screen 60 includes, for example, setting columns 600 of a plurality of evaluation items such as an object size setting column 600a, and an object speed setting column 600b. As shown in FIG. 7, the plurality of evaluation items includes, for example, an object size, an object speed, an object staying time, an object aspect ratio, a predicted time up until an object goes outside the screen, a distance between an object and a home position, an object tracking time, an object stopping time or the like. Here, an object aspect ratio is an evaluation item used for distinguishing an object type of a detection target, such as distinguishing between a person and a vehicle, for example. Note that, being able to identify an object type with a low calculation amount can be included as an advantage of using an aspect ratio.

Further, a predicted time up until an object goes outside the screen is a time at which an object movement speed is calculated based on a change of position in a past frame, for example, and is predicted based on the calculated movement speed. This "predicted time up until an object goes outside the screen" is an evaluation item used in the case where photographing at least one time, for example, even if it is an object moving at a high speed. Note that, a home position is an example of a monitoring target region in an embodiment of the present disclosure. This home position is determined, for example, for each detection frame of an object. As an example, a detection frame can be determined, for example, for each location where a user desires to monitor such as a passage, a building entrance, or a restricted region. Further, a detection frame of an object may be set in association with each of the plurality of picture cropping units 106 included in the camera 10.

For example, the example shown in FIG. 7 shows an object speed, an object aspect ratio, a distance up to a home position, and an object stopping time selected as evaluation items by a user. In addition, FIG. 7 shows evaluation standards specified so that an evaluation becomes higher, such as an object with an object speed faster than a stipulated value, an object with an object aspect ratio smaller than a stipulated value, an object with a distance up to a home position longer than a stipulated value, or an object with an object stopping time shorter than a stipulated value.

{1-3-4. Input Unit 226}

The input unit 226 includes, for example, an input apparatus such as a mouse, a keyboard, a touch panel, or a microphone. This input unit 226 receives various types of inputs by a user to the monitoring terminal 22. For example, the input unit 226 receives an input of detection specification information to the evaluation standard setting screen displayed in the display unit 224.

<1-4. Communication Network 24>

The communication network 24 is a wired or wireless transmission path of information transmitted from apparatuses connected to the communication network 24. For example, the communication network 24 may include a public line network such as a telephone line network, the Internet, or a satellite communication network, or various types of Local Area Networks (LAN), Wide Area Networks (WAN) or the like that include an Ethernet (registered trademark). Further, the communication network 24 may include a dedicated line network such as an Internet Protocol-Virtual Private Network (IP-VPN).

Note that, the image processing system according to the present embodiment is not limited to the above described configuration. For example, the storage 20 and the monitoring terminal 22 may be integrally constituted. Or, it is possible for the present image processing system to not include the storage 20 or the monitoring terminal 22.

In the above described image processing system, it is possible for the camera 10 according to the present embodiment to automatically select the most suitable cropping target, based on detection specification information specified by a user.

<<2. Detailed Description of the Embodiments>>

<2-1. Configuration>

Heretofore, a configuration of the image processing system according to the present embodiment has been described. Next, a configuration of the camera 10 according to the present embodiment will be described in detail.

The features of the configuration of the camera 10 according to the present embodiment are related, in particular, to the configuration of the region setting unit 104. Hereinafter, a configuration of the region setting unit 104 will be additionally described in detail by referring to FIG. 8.

As shown in FIG. 8, the region setting unit 104 includes an object detection unit 120, a cropped region determination unit 122, and an overlapping decision unit 124.

{2-1-1. Object Detection Unit 120}

(2-1-1-1. Detection Example 1)

The object detection unit 120 detects an object of a cropping target from within a detection frame in a frame image (hereinafter, called a present frame image) acquired by the photographing unit 100, for example, based on detection specification information received from the monitoring terminal 22. For example, the object detection unit 120 detects, as a cropping target, an object with the highest value evaluated by an evaluation standard of an evaluation item included in the received detection specification information, from among a plurality of objects included in a detection frame.

Note that, in the case where the received detection specification information includes a plurality of evaluation items, it is also possible for the object detection unit 120 to detect an object of a cropping target based on a combination of evaluation values by the evaluation standards of each of the plurality of evaluation items included in this detection specification information, from among a plurality of objects included in a detection frame. For example, in the above described case, the object detection unit 120 first performs an evaluation for each of a plurality of objects included in a detection frame, in accordance with the evaluation standards for each of the plurality of evaluation items shown by this detection specification information, and calculates a total of the evaluation values of each evaluation item. Then, the object detection unit 120 detects, as a cropping target, an object with the highest total of the evaluation values of each evaluation item.

(2-1-1-2. Detection Example 2)

Further, in the case where the received detection specification information includes the evaluation item "object stopping time", the object detection unit 120 decides whether or not to switch an object of a detection target, based on a comparison between the length of time that the present object of a detection target is estimated to have stopped, and a stopping upper limit time included in this detection specification information.

For example, in the case where the length of time that the present object of a detection target is estimated to have stopped is larger than a stopping upper limit time, the object detection unit 120 decides to switch an object of a detection target to another object. Further, in the case where the length of time that the present object of a detection target is estimated to have stopped is smaller than a stopping upper limit time, the object detection unit 120 decides to set an object of a detection target the same as in the previous frame image. Note that, in the case where a change amount of a detection position of an object of a detection target between consecutive frame images is within a prescribed range, for example, it is possible for the object detection unit 120 to estimate that this object is stopped.

Further, in the case where the received detection specification information includes the evaluation item "object tracking time", the object detection unit 120 decides whether or not to switch an object of a detection target, based on a comparison between a continuation time of the detection of the present object of a detection target, and a tracking upper limit time included in this detection specification information. Note that, a tracking upper limit time is an upper limit value of time to maintain an object of a cropping target to a same object.

For example, in the case where a continuation time of the detection of the present object of a detection target exceeds a tracking upper limit time, the object detection unit 120 decides to switch an object of a detection target to another object. Further, in the case where a continuation time of the detection of the present object of a detection target is a tracking upper limit time or less, the object detection unit 120 decides to set an object of a detection target the same as in the previous frame image.

Further, in the case where the received detection specification information includes the evaluation item "distance between an object and a home position", the object detection unit 120 decides whether or not to switch an object of a detection target, based on a comparison between a distance between a home position set beforehand in a moving image and the present object of a detection target, and a monitoring upper limit distance included in this detection specification information.

For example, in the case where a distance between the home position and the present object of a detection target exceeds a monitoring upper limit distance, the object detection unit 120 decides to switch an object of a detection target to another object, such as an object positioned closest to the home position, for example. Further, in the case where a distance between the home position and the present object of a detection target is within a monitoring upper limit distance, the object detection unit 120 decides to set an object of a detection target the same as in the previous frame image.

(2-1-1-3. Detection Example 3)

Further, in the case where it is decided that the cropped regions are overlapping by the overlapping decision unit 124, which will be described below, the object detection unit 120 decides to switch an object of a cropping target of any of the decided cropped regions to another object.

For example, in the case where the "switching time of a detection target" included in the received detection specification information has passed, at the time when it is decided that the cropped regions are overlapping by the overlapping decision unit 124, the object detection unit 120 decides to switch an object of a cropping target of any of the overlapping cropped regions to another object.

Note that, as a modified example, the object detection unit 120 may decide a cropped region for which an object of a cropping target is to be switched to another object (hereinafter, called a cropping target switching region), from among the cropped regions for which it has been decided that the cropped regions are overlapping by the overlapping decision unit 124, in accordance with the received detection specification information. For example, the object detection unit 120 may determine a cropped region, which includes a cropping target with a low value of an evaluation item included in the received detection specification information, from among the overlapping cropped regions, to be a cropping target switching region. Further, the object detection unit 120 may determine a cropped region, for which the detection (tracking) of an object of a cropping target is continuing from an earlier time, from among the overlapping cropped regions, to be a cropping target switching region.

(2-1-1-4. Detection Example 4)

Note that, it is possible for the object detection unit 120 to detect a prescribed number of objects, such as a number within the number of picture cropping units 106, for example, from within the present frame image.

(2-1-1-5. Detection Example 5)

Further, in the case where an object of a cropping target (tracking target) is not present within a detection frame, it is possible for the object detection unit 120 to not detect any objects.

{2-1-2. Cropped Region Determination Unit 122}

(2-1-2-1. Determination Example 1)

The cropped region determination unit 122 is an example of a segmented region determination unit in an embodiment of the present disclosure. The cropped region determination unit 122 determines a cropped region in the present frame image, so that a detection position of an object detected by the object detection unit 120 is included. For example, the cropped region determination unit 122 determines a cropped region in the present frame image, so that a detection position of an object detected by the object detection unit 120 becomes the center of the cropped region.

Note that, the shape and size of the cropped region in the frame image is basically determined the same in all of the frame images. Further, the size of the cropped region is basically determined to a predetermined size.

(2-1-2-2. Determination Example 2)

Note that, in the case where no objects have been detected by the object detection unit 120, the cropped region determination unit 122 may determine not to output any region. Or, in the above described case, the cropped region determination unit 122 may determine a region that includes a home position as a cropped region.

{2-1-3. Overlapping Decision Unit 124}

At the time when a cropped region has been determined by the cropped region determination unit 122, the overlapping decision unit 124 decides whether or not this cropped region is overlapping with another cropped region, based on an overlapping decision condition included in the received detection specification information. For example, in the case where the ratio of the area of an overlapping region is a prescribed threshold or more, with respect to the area of the cropped region, the overlapping decision unit 124 decides that this cropped region is overlapping with the other cropped region. Further, in the case where a distance from the center of this cropped region up to another cropped region is a prescribed threshold or less, the overlapping decision unit 124 decides that this cropped region is overlapping with the other cropped region.

<2-2. Operation>

Heretofore, a configuration according to an embodiment of the present disclosure has been described. To continue, the operation according to the present embodiment will be described by referring to FIG. 9 to FIG. 11. Note that, here, an operation example will be described in a scene where the camera 10 has four picture cropping units 106, and one reduced image and four cropped images are generated from one frame image. Note that, this operation is repeatedly executed for each prescribed frame rate.

{2-2-1. Entire Operation}

FIG. 9 is a flow chart that shows an operation example according to the present embodiment. As shown in FIG. 9, first the photographing unit 100 of the camera 10 acquires a frame image by photographing an external picture, when a prescribed photographing timing is reached (S101).

To continue, the picture reduction unit 102 generates a reduced image by reducing the frame image acquired in step S101 (hereinafter, called a present frame image) to a prescribed size (S103).

Afterwards, the camera 10 repeatedly performs a "cropped image generation process", which will be described below, the number of the picture cropping units 106, that is, four times (S105 to S111).

Afterwards, the communication unit 108 transmits the reduced image generated in S103 and the four cropped images generated in step S107 to the storage 20 (S113).

{2-2-2. Cropped Image Generation Process}

Here, the operation of the "cropped image generation process" in S107 will be described in detail by referring to FIG. 10 to FIG. 11. As shown in FIG. 10, first the object detection unit 120 of the camera 10 detects an object set as an I-th placed cropping target, that is, an object being tracked (S151).

To continue, the cropped region determination unit 122 determines a cropped region in the present frame image, so that a detection position of the object detected in S151 becomes the center of the cropped region (S153).

Here, the operations after S153 will be described by referring to FIG. 11. As shown in FIG. 11, after step S153, the object detection unit 120 decides whether or not the total of a tracking time (from a tracking start) of the object detected in S151 has passed a tracking upper limit time (S161). In the case where the total of the object tracking time has passed a tracking upper limit time (S161: Yes), the object detection unit 120 switches the I-th placed cropping target to another object (S163). Afterwards, the camera 10 again performs the operation of S153.

On the other hand, in the case were the total of the object tracking time has not passed a tracking upper limit time (S161: No), next the object detection unit 120 decides whether or not the total of a stopping time (from the time when a stop has been detected) of the object detected in S151 has passed a stopping upper limit time (S165). In the case where the total of the object stopping time has passed a stopping upper limit time (S165: Yes), the object detection unit 120 performs the operation of S163.

On the other hand, in the case where the total of the object stopping time has not passed a stopping upper limit time (S165: No), the overlapping decision unit 124 decides whether or not the cropped region determined in S153 is overlapping with another cropped region within the same frame image (S167). In the case where this cropped region is overlapping with another cropped region (S167: Yes), the object detection unit 120 performs the operation of S163.

On the other hand, in the case where this cropped region is not overlapping with another cropped region (S167: No), the picture cropping unit 106 generates a cropped image, by segmenting this cropped region from the present frame image (S169).

<2-3. Effect>

{2-3-1. Effect 1}

Heretofore, for example, as described with reference to FIG. 4, FIG. 8 to FIG. 11 or the like, the camera 10 according to the present embodiment detects an object based on an evaluation item selected by a user from among a plurality of evaluation items, and determines a cropped region in the present frame image, so that a detection position of the detected object is included. Accordingly, the most suitable cropping target can be automatically selected, from among a plurality of objects included in the frame image. Further, an object of a cropping target can be similarly optimized with respect to the length of time to be cropped.

{2-3-2. Effect 2}

Further, in the case where the time that an object of a cropping target is estimated to have stopped exceeds a stopping upper limit time, the camera 10 switches an object of a cropping target to another object, and determines a cropped region so that the object after switching becomes the center. Accordingly, even if an object determined once to be a cropping target continues to be positioned at the same location, an object of a cropping target is changed to another object, if a stopping condition time has passed. Therefore, the same location continuing to be set to a segmented region for a long time can be prevented.

{2-3-3. Effect 3}

Further, since the determination method of a cropped region by the cropped region determination unit 122 is a simple method, the camera 10 can perform the generation of a cropped image in real time.

{2-3-4. Effect 4}

Further, according to the present embodiment, it is possible to generate a reduced image and cropped images only with the camera 10 unit. Accordingly, since it may not be necessary for the camera 10 to transmit a frame image to another apparatus such as a server, for example, for generating a reduced image and cropped images, the communication amount can be reduced.

<<3. Modifications>>

It should be understood by those skilled in the art that various modifications, combinations, sub-combinations and alterations may occur depending on design requirements and other factors insofar as they are within the scope of the appended claims or the equivalents thereof.

<3-1. Modified Example 1>

While an example has been described in the above described embodiments where the image processing apparatus according to an embodiment of the present disclosure is the camera 10, it is not limited to such an example. For example, in the case where (the control unit 220 of) the monitoring terminal 22 has all of the above described picture reduction unit 102, region setting unit 104, and plurality of picture cropping units 106, instead of the camera 10, the image processing apparatus according to the present embodiment may be the monitoring terminal 22.

Further, in the case where a separately included server (illustration omitted) is able to communicate with the camera 10, for example, via the communication network 24, and this server has all of the above described picture reduction unit 102, region setting unit 104, and plurality of picture cropping units 106, instead of the camera 10, the image processing apparatus according to an embodiment of the present disclosure may be the server. Further, this server and the storage 20 may be integrally constituted.

<3-2. Modified Example 2>

Further, while an example has been described in the above description where a tracking upper limit time of an object, and a stopping upper limit time of an object, are values included in detection specification information, that is, are fixed values, it is not limited to such an example, and the camera 10 may dynamically determine a tracking upper limit time, or a stopping upper limit time. For example, the camera 10 may dynamically determine a tracking upper limit time, or a stopping upper limit time, for each detection frame. As an example, the camera 10 may make a tracking upper limit time longer as the number of untracked objects decreases, for each detection frame. Further, in the case where a monitoring target region is included, for example, in a detection frame, the camera 10 may make a tracking upper limit time longer.

<3-3. Modified Example 3>

Further, according to the above described embodiments, a computer program for causing hardware such as a CPU, a ROM, and a RAM, for example, to exhibit functions the same as the above described picture reduction unit 102, region setting unit 104, and picture cropping unit 106 can be provided. Further, a recording medium to which this computer program is recorded can also be provided.

Additionally, the present technology may also be configured as below.

(1) An information processing apparatus, including:
circuitry configured to
generate or receive a first image of a sequence of images including an object, determine a length of time movement of the object is below a predetermined movement threshold, and
identify the object as a target object based on the determined length of time the movement of the object is below the predetermined movement threshold.

(2) The information processing apparatus according to feature (1), in which the circuitry is configured to:
receive or generate the sequence of images, including the first image and a second image captured before the first image, the object being identified as the target object in the second image,
determine whether to continue to identify the object as the target object in the first image based on the determined length of time the movement of the object is below the predetermined movement threshold, and
identify the object as the target object when the circuitry determines to continue to identify the object as the target object in the first image.

(3) The information processing apparatus according to feature (2), in which the circuitry is configured to change the target object from the object to a different object included in the first image when the circuitry determines not to continue identifying the object as the target object.

(4) The information processing apparatus according to any of features (1) to (3), in which the circuitry is configured to:
determine whether the length of time the movement of the object is below the predetermined movement threshold exceeds an upper time limit, and
identify the object as the target object when the length of time the movement of the object is below the predetermined movement threshold is less than or equal to the upper time limit.

(5) The information processing apparatus according to any of features (1) to (4), in which the circuitry is configured to:
determine whether the length of time the movement of the object is below the predetermined movement threshold exceeds an upper time limit, and
identify a different object included in the first image as the target object when the length of the time the movement of the object is below the predetermined movement threshold exceeds the upper time limit.

(6) The information processing apparatus according to any of features (1) to (5), further including
an image sensor configured to capture the sequence of images, including the first image.

(7) The information processing apparatus according to any of features (1) to (6), in which
the target object is a cropping target, and
the circuitry is configured to generate a cropped image by cropping the first image based on a position of the object within the first image when the object is identified as the target object.

(8) The information processing apparatus according to any of features (1) to (7), in which
the circuitry is configured to transmit a plurality of image streams,
the plurality of image streams includes cropped images of different portions of each of the sequence of images, and
each of the different portions corresponds to a different object.

(9) The information processing apparatus according to feature (7), in which the circuitry is configured to:
generate a lower resolution version of the first image, and
transmit the cropped image and the lower resolution version of the first image.

(10) The information processing apparatus according to any of features (1) to (9), in which the circuitry is configured to:
identify the object as the target object based on the determined length of time the movement of the object is below the predetermined movement threshold and a length of time the object is identified as the target object.

(11) The information processing apparatus according to any of features (1) to (10), in which the predetermined movement threshold corresponds to an amount of movement between successive images in the sequence of images.

(12) The information processing apparatus according to any of features (1) to (11), in which the circuitry is configured to:
set an upper time limit based on a user input, and
identify the object as the target object based on a comparison of the length of time the movement of the object is below the predetermined movement threshold and the set upper time limit.

(13) The information processing apparatus according to any of features (1) to (12), in which the circuitry is configured to:
set different upper time limits for different images, including the first image, in the sequence of images, and
identify the object as the target object in the first image based on a comparison of the length of time the movement of the object is below the predetermined movement threshold and the upper time limit set for the first image.

(14) The information processing apparatus according to any of features (1) to (13), in which the circuitry is configured to:
detect a plurality of objects included in the first image, and
identify a subset of the plurality of objects as target objects in the first image when a number of the plurality of objects exceeds a predetermined maximum number of target objects, the predetermined maximum number being greater than 1.

(15) The information processing apparatus according to any of features (1) to (14), in which the circuitry is configured to:
continue to identify the object as the target object in subsequent successive images of the sequence of images, including the object and captured after the first image, until the length of time the movement of the object is below the predetermined movement threshold exceeds an upper limit time limit.

(16) The information processing apparatus according to any of features (1) to (15), in which the circuitry is configured to:
determine a plurality of cropped regions of the first image, each of the cropped images corresponding to a different target object, and
determine whether a first one of the plurality of cropped regions overlaps with a second one of the plurality of cropped regions.

(17) The information processing apparatus according to feature (16), in which the circuitry is configured to:
determine that the first one of the plurality of cropped regions overlaps with the second one of the plurality of cropped regions when an area of an overlapping region for the first one of the plurality of cropped regions and the second one of the plurality of cropped regions exceeds a first predetermined overlap threshold or a distance between the centers of the first one of the plurality of cropped regions and the second one of the plurality of cropped regions exceeds a second predetermined overlap threshold.

(18) The information processing apparatus according to any of features (1) to (17), in which the length of time the movement of the object is below the predetermined movement threshold indicates a length of time the object has stopped.

(19) A method of an information processing apparatus for identifying a target object, the method comprising:
 generating or receiving a first image of a sequence of images including an object;
 determining, by circuitry of the information processing apparatus, a length of time movement of the object is below the predetermined movement threshold, and
 identifying, by the circuitry, the object as the target object based on the determined length of time the movement of the object is below the predetermined movement threshold.

(20) The method according to feature (19), further including:
 receiving or generating the sequence of images, including the first image and a second image captured before the first image, the object being identified as the target object in the second image,
 determining whether to continue to identify the object as the target object in the first image based on the determined length of time the movement of the object is below the predetermined movement threshold, and
 identifying the object as the target object when the step of determining whether to continue determines to continue to identify the object as the target object in the first image.

(21) The method according to feature (20), further including:
 changing the target object from the object to a different object included in the first image when the step of determining whether to continue determines not to continue identifying the object as the target object.

(22) The method according to any of features (19) to (21), further including:
 determining whether the length of time the movement of the object is below the predetermined movement threshold exceeds an upper time limit, in which
 the step of identifying includes identifying the object as the target object when the length of time the movement of the object is below the predetermined movement threshold is less than or equal to the upper time limit.

(23) The method according to any of features (19) to (22), further including:
 determining whether the length of time the movement of the object is below the predetermined movement threshold exceeds an upper time limit, and
 identifying a different object included in the first image as the target object when the length of the time the movement of the object is below the predetermined movement threshold exceeds the upper time limit.

(24) The method according to any of features (19) to (23), further including capturing, by an image sensor, the sequence of images, including the first image.

(25) The method according to any of features (19) to (24), in which
 the target object is a cropping target, and
 the method further includes generating a cropped image by cropping the first image based on a position of the object within the first image when the object is identified as the target object.

(26) The method according to any of features (19) to (25), further including:
 transmitting a plurality of image streams, in which
 the plurality of image streams includes cropped images of different portions of each of the sequence of images, and
 each of the different portions corresponds to a different object.

(27) The method according to feature (25), further including:
 generating a lower resolution version of the first image, and
 transmitting the cropped image and the lower resolution version of the first image.

(28) The method according to any of features (19) to (27), in which the step of identifying includes:
 identifying the object as the target object based on the determined length of time the movement of the object is below the predetermined movement threshold and a length of time the object is identified as the target object.

(29) The method according to any of features (19) to (28), in which the predetermined movement threshold corresponds to an amount of movement between successive images in the sequence of images.

(30) The method according to any of features (19) to (29), further including:
 setting an upper time limit based on a user input, in which
 the step of identifying includes identifying the object as the target object based on a comparison of the length of time the movement of the object is below the predetermined movement threshold and the set upper time limit.

(31) The method according to any of features (19) to (30), further including:
 setting different upper time limits for different images, including the first image, in the sequence of images, in which
 the step of identifying includes identifying the object as the target object in the first image based on a comparison of the length of time the movement of the object is below the predetermined movement threshold and the upper time limit set for the first image.

(32) The method according to any of features (19) to (31), further including:
 detecting a plurality of objects included in the first image, and
 identifying a subset of the plurality of objects as target objects in the first image when a number of the plurality of objects exceeds a predetermined maximum number of target objects, the predetermined maximum number being greater than 1.

(33) The method according to any of features (19) to (32), further including:
 continuing to identify the object as the target object in subsequent successive images of the sequence of images, including the object and captured after the first image, until the length of time the movement of the object is below the predetermined movement threshold exceeds an upper limit time limit.

(34) The method according to any of features (19) to (33), further including:
 determining a plurality of cropped regions of the first image, each of the cropped images corresponding to a different target object, and
 determining whether a first one of the plurality of cropped regions overlaps with a second one of the plurality of cropped regions.

(35) The method according to feature (34), further including:

determining that the first one of the plurality of cropped regions overlaps with the second one of the plurality of cropped regions when an area of an overlapping region for the first one of the plurality of cropped regions and the second one of the plurality of cropped regions exceeds a first predetermined overlap threshold or a distance between the centers of the first one of the plurality of cropped regions and the second one of the plurality of cropped regions exceeds a second predetermined overlap threshold.

(36) The method according to any of features (19) to (35), in which the length of time the movement of the object is below the predetermined movement threshold indicates a length of time the object has stopped.

(37) A non-transitory computer-readable medium storing instructions which when executed by a computer cause the computer to perform a method of an information processing apparatus for identifying a target object, the method comprising:

generating or receiving a first image of a sequence of images including an object;

determining, a length of time movement of the object is below the predetermined movement threshold, and identifying the object as the target object based on the determined length of time the movement of the object is below the predetermined movement threshold.

(38) The non-transitory computer-readable medium according to feature (37), further including:

receiving or generating the sequence of images, including the first image and a second image captured before the first image, the object being identified as the target object in the second image, determining whether to continue to identify the object as the target object in the first image based on the determined length of time the movement of the object is below the predetermined movement threshold, and identifying the object as the target object when the step of determining whether to continue determines to continue to identify the object as the target object in the first image.

(39) The non-transitory computer-readable medium according to feature (38), further including:

changing the target object from the object to a different object included in the first image when the step of determining whether to continue determines not to continue identifying the object as the target object.

(40) The non-transitory computer-readable medium according to any of features (37) to (39), further including:

determining whether the length of time the movement of the object is below the predetermined movement threshold exceeds an upper time limit, in which the step of identifying includes identifying the object as the target object when the length of time the movement of the object is below the predetermined movement threshold is less than or equal to the upper time limit.

(41) The non-transitory computer-readable medium according to any of features (37) to (40), further including:

determining whether the length of time the movement of the object is below the predetermined movement threshold exceeds an upper time limit, and identifying a different object included in the first image as the target object when the length of the time the movement of the object is below the predetermined movement threshold exceeds the upper time limit.

(42) The non-transitory computer-readable medium according to any of features (37) to (51), further including capturing, by an image sensor, the sequence of images, including the first image.

(43) The method according to any of features (37) to (42), in which the target object is a cropping target, and the method further includes generating a cropped image by cropping the first image based on a position of the object within the first image when the object is identified as the target object.

(44) The non-transitory computer-readable medium according to any of features (37) to (43), further including:

transmitting a plurality of image streams, in which the plurality of image streams includes cropped images of different portions of each of the sequence of images, and each of the different portions corresponds to a different object.

(45) The non-transitory computer-readable medium according to feature (43), further including:

generating a lower resolution version of the first image, and transmitting the cropped image and the lower resolution version of the first image.

(46) The non-transitory computer-readable medium according to any of features (37) to (45), in which the step of identifying includes:

identifying the object as the target object based on the determined length of time the movement of the object is below the predetermined movement threshold and a length of time the object is identified as the target object.

(47) The non-transitory computer-readable medium according to any of features (37) to (46), in which the predetermined movement threshold corresponds to an amount of movement between successive images in the sequence of images.

(48) The non-transitory computer-readable medium according to any of features (37) to (47), further including:

setting an upper time limit based on a user input, in which the step of identifying includes identifying the object as the target object based on a comparison of the length of time the movement of the object is below the predetermined movement threshold and the set upper time limit.

(49) The non-transitory computer-readable medium according to any of features (37) to (48), further including:

setting different upper time limits for different images, including the first image, in the sequence of images, in which the step of identifying includes identifying the object as the target object in the first image based on a comparison of the length of time the movement of the object is below the predetermined movement threshold and the upper time limit set for the first image.

(50) The non-transitory computer-readable medium according to any of features (37) to (48), further including:

detecting a plurality of objects included in the first image, and identifying a subset of the plurality of objects as target objects in the first image when a number of the plurality of objects exceeds a predetermined maximum number of target objects, the predetermined maximum number being greater than 1.

(51) The non-transitory computer-readable medium according to any of features (37) to (50), further including:

continuing to identify the object as the target object in subsequent successive images of the sequence of images, including the object and captured after the first image, until the length of time the movement of the object is below the predetermined movement threshold exceeds an upper limit time limit.

(52) The non-transitory computer-readable medium according to any of features (37) to (51), further including:
determining a plurality of cropped regions of the first image, each of the cropped images corresponding to a different target object, and
determining whether a first one of the plurality of cropped regions overlaps with a second one of the plurality of cropped regions.

(53) The non-transitory computer-readable medium according to feature (52), further including:
determining that the first one of the plurality of cropped regions overlaps with the second one of the plurality of cropped regions when an area of an overlapping region for the first one of the plurality of cropped regions and the second one of the plurality of cropped regions exceeds a first predetermined overlap threshold or a distance between the centers of the first one of the plurality of cropped regions and the second one of the plurality of cropped regions exceeds a second predetermined overlap threshold.

(54) The non-transitory computer-readable medium according to any of features (37) to (53), in which the length of time the movement of the object is below the predetermined movement threshold indicates a length of time the object has stopped.

(55)
An image processing apparatus, including:
an object detection unit configured to detect a first object from a first frame image included in a moving image; and
a segmented region determination unit configured to determine a segmented region of the first frame image so that a detection position of the first object is included,
wherein the segmented region determination unit, in a second frame image after the first frame image, determines a segmented region of the second frame image based on a length of time the first object is estimated to have stopped.

(56)
The image processing apparatus according to (55),
wherein the segmented region determination unit determines a segmented region of the second frame image based on whether or not a length of time the first object is estimated to have stopped is larger than a stopping upper limit time.

(57)
The image processing apparatus according to (56),
wherein, in the case where the second frame image is a frame image at the time when or after a time the first object is estimated to have stopped exceeds the stopping upper limit time, the object detection unit detects a second object from the second frame image, and
wherein the segmented region determination unit determines a segmented region of the second frame image so that a detection position of the second object is included.

(58)
The image processing apparatus according to (56) or (57),
wherein, in the case where the second frame image is a frame image at the time when a time the first object is estimated to have stopped is the stopping upper limit time or less, the segmented region determination unit determines a segmented region of the second frame image so that a detection position of the first object is included.

(59)
The image processing apparatus according to any one of (55) to (58),
wherein a length of time the first object is estimated to have stopped is a length of time a change amount of a detection position of the first object between consecutive frame images is within a prescribed range.

(60)
The image processing apparatus according to (59), further including:
an acquisition unit configured to acquire a length of a stopping upper limit time specified by a user,
wherein the segmented region determination unit determines a segmented region of the second frame image based on whether or not a length of time the first object is estimated to have stopped is a stopping upper limit time acquired by the acquisition unit or more.

(61)
The image processing apparatus according to any one of (56) to (58),
wherein a shape and a size of a segmented region of the second frame image are the same as a shape and a size of a segmented region of the first frame image.

(62)
The image processing apparatus according to any one of (56) to (59), further including:
an acquisition unit configured to acquire target information selected by a user from among a plurality of target information pieces for determining a segmented region from the moving image,
wherein the segmented region determination unit additionally determines a segmented region of the second frame image based on target information acquired by the acquisition unit.

(63)
The image processing apparatus according to (62),
wherein the plurality of target information pieces includes a tracking upper limit time that is an upper limit value of a time to equally maintain an object of a segmentation target corresponding to a segmented region,
wherein, in the case where the second frame image is a frame image at the time when or after a continuation time of detection of the first object by the object detection unit exceeds a tracking upper limit time acquired by the acquisition unit, the object detection unit detects a second object from the second frame image, and
wherein the segmented region determination unit determines a segmented region of the second frame image so that a detection position of the second object is included.

(64)
The image processing apparatus according to (62),
wherein the object detection unit additionally detects a prescribed number of objects from the second frame image, and
wherein the segmented region determination unit determines the prescribed number of segmented regions from within the second frame image based on detection positions of the respective prescribed number of objects.

(65)
The image processing apparatus according to (64),
wherein the plurality of target information pieces includes an overlapping decision condition for deciding an overlap of a plurality of segmented regions,
wherein, in the case where it is decided that a first segmented region and a second segmented region from among the prescribed number of segmented regions are partially overlapping based on an overlapping decision condition acquired by the acquisition unit, the object detection unit detects a third object different to an object detected in association with the second segmented region from the second frame image, and wherein the segmented region determination unit changes a position of the second segmented region so that a detection position of the third object is included.

(66)

The image processing apparatus according to (62), wherein a monitoring target region is set beforehand in the moving image, wherein the plurality of target information pieces includes a monitoring upper limit distance that is an upper limit value of a distance between an object of a segmentation target corresponding to a segmented region and the monitoring target region, wherein, in the case where the second frame image is a frame image at the time when or after a distance between the first object and the monitoring target region exceeds a monitoring upper limit distance acquired by the acquisition unit, the object detection unit detects a second object from the second frame image, and wherein the segmented region determination unit determines a segmented region of the second frame image so that a detection position of the second object is included.

(67)

The image processing apparatus according to (66), wherein the second object is an object positioned closest to the monitoring target region from among a plurality of objects included in the second frame image.

(68)

The image processing apparatus according to any one of (63) to (67), wherein the plurality of target information pieces includes an object region size of a detection target, an object movement speed of a detection target, an object staying time of a detection target, an object aspect ratio of a detection target, or a predicted time up until an object of a detection target moves outside of a region of the moving image.

(69)

The image processing apparatus according to any one of (55) to (65), further including:

a segmented image generation unit configured to generate a segmented image by segmenting the segmented region determined by the segmented region determination unit from the second frame image.

(70)

An image processing method, including:

detecting a first object from a first frame image included in a moving image;

determining a segmented region of the first frame image so that a detection position of the first object is included; and determining, in a second frame image after the first frame image, a segmented region of the second frame image based on a length of time the first object is estimated to have stopped.

(71)

An image processing system, including:

an object detection unit configured to detect a first object from a first frame image included in a moving image;

a segmented region determination unit configured to determine a segmented region of the first frame image so that a detection position of the first object is included;

a segmented image generation unit configured to generate a segmented image by segmenting the segmented region determined by the segmented region determination unit from the first frame image; and a storage unit configured to store the generated segmented image, wherein the segmented region determination unit, in a second frame image after the first frame image, determines a segmented region of the second frame image based on a length of time the first object is estimated to have stopped.

REFERENCE SIGNS LIST 10 camera
20 storage
22 monitoring terminal
24 communication network
100 photographing unit
102 picture reduction unit
104 region setting unit
106 picture cropping unit
108 communication unit
120 object detection unit
122 cropped region determination unit
124 overlapping decision unit
220 control unit
222 communication unit
224 display unit
226 input unit

The invention claimed is:

1. An information processing apparatus, comprising:
circuitry configured to:
generate or receive a first image of a sequence of images including a plurality of objects,
determine for each of the objects a length of time during which a movement of an object is below a predetermined movement threshold,
identify the object as a target object based on the determined length of time during which the movement of the object is below the predetermined movement threshold,
generate a reduced image from the first image by lowering a resolution of the first image, wherein the target object in the reduced image is less visually recognizable than the target object in the first image,
generate a cropped image from the first image by cropping the first image by cropping each of the objects identified as the target object, the cropped image having the lowered resolution of the first image, and
display the reduced image and the cropped image so that a user can visually confirm a full view of the first image and the each of the objects identified as the target object in the cropped image.

2. The information processing apparatus according to claim 1, wherein the circuitry is configured to:
receive or generate the sequence of images, including the first image and a second image captured before the first image, the object being identified as the target object in the second image,
determine whether to continue to identify the object as the target object in the first image based on the determined length of time during which the movement of the object is below the predetermined movement threshold, and
identify the object as the target object when the circuitry determines to continue to identify the object as the target object in the first image.

3. The information processing apparatus according to claim 2, wherein the circuitry is configured to change the target object from the object to a different object included in the first image when the circuitry determines not to continue identifying the object as the target object.

4. The information processing apparatus according to claim 1, wherein the circuitry is configured to:

determine whether the length of time during which the movement of the object is below the predetermined movement threshold exceeds an upper time limit, and identify the object as the target object when the length of time during which the movement of the object is below the predetermined movement threshold is less than or equal to the upper time limit.

5. The information processing apparatus according to claim 1, wherein the circuitry is configured to:

determine whether the length of time during which the movement of the object is below the predetermined movement threshold exceeds an upper time limit, and identify a different object included in the first image as the target object when the length of the time during which the movement of the object is below the predetermined movement threshold exceeds the upper time limit.

6. The information processing apparatus according to claim 1, further comprising:

an image sensor configured to capture the sequence of images, including the first image.

7. The information processing apparatus according to claim 1, wherein the target object is a cropping target, and the circuitry is configured to generate the cropped image by cropping the first image based on a position of the object within the first image when the object is identified as the target object.

8. The information processing apparatus according to claim 7, wherein the circuitry is configured to:

transmit the cropped image and the reduced image.

9. The information processing apparatus according to claim 1, wherein the circuitry is configured to transmit a plurality of image streams, the plurality of image streams includes cropped images of different portions of each of the sequence of images, and each of the different portions corresponds to a different object.

10. The information processing apparatus according to claim 1, wherein the circuitry is configured to:

identify the object as the target object based on the determined length of time during which the movement of the object is below the predetermined movement threshold and another length of time during which the object is identified as the target object.

11. The information processing apparatus according to claim 1, wherein the predetermined movement threshold corresponds to an amount of movement between successive images in the sequence of images.

12. The information processing apparatus according to claim 1, wherein the circuitry is configured to:

set an upper time limit based on a user input, and identify the object as the target object based on a comparison of the length of time during which the movement of the object is below the predetermined movement threshold and the set upper time limit.

13. The information processing apparatus according to claim 1, wherein the circuitry is configured to:

set different upper time limits for different images, including the first image, in the sequence of images, and identify the object as the target object in the first image based on a comparison of the length of time during which the movement of the object is below the predetermined movement threshold and the upper time limit set for the first image.

14. The information processing apparatus according to claim 1, wherein the circuitry is configured to:

detect the plurality of objects included in the first image, and identify a subset of the plurality of objects as target objects in the first image when a number of the plurality of objects exceeds a predetermined maximum number of target objects, the predetermined maximum number being greater than 1.

15. The information processing apparatus according to claim 1, wherein the circuitry is configured to:

continue to identify the object as the target object in subsequent successive images of the sequence of images, including the object and captured after the first image, until the length of time during which the movement of the object is below the predetermined movement threshold exceeds an upper time limit.

16. The information processing apparatus according to claim 1, wherein the circuitry is configured to:

determine a plurality of cropped regions of the first image, each of the cropped regions corresponding to a different target object, and determine whether a first one of the plurality of cropped regions overlaps with a second one of the plurality of cropped regions.

17. The information processing apparatus according to claim 16, wherein the circuitry is configured to:

determine that the first one of the plurality of cropped regions overlaps with the second one of the plurality of cropped regions when an area of an overlapping region for the first one of the plurality of cropped regions and the second one of the plurality of cropped regions exceeds a first predetermined overlap threshold or a distance between centers of the first one of the plurality of cropped regions and the second one of the plurality of cropped regions exceeds a second predetermined overlap threshold.

18. The information processing apparatus according to claim 1, wherein the length of time during which the movement of the object is below the predetermined movement threshold indicates a length of time during which the object has stopped.

19. A method of an information processing apparatus for identifying a target object, the method comprising:

generating or receiving a first image of a sequence of images including a plurality of objects;

determining, by circuitry of the information processing apparatus, for each of the objects a length of time during which a movement of an object is below a predetermined movement threshold;

identifying, by the circuitry, the object as the target object based on the determined length of time during which the movement of the object is below the predetermined movement threshold;

generating a reduced image from the first image by lowering a resolution of the first image, wherein the target object in the reduced image is less visually recognizable than the target object in the first image;

generating a cropped image from the first image by cropping the first image by cropping each of the objects identified as the target object, the cropped image having the lowered resolution of the first image; and displaying the reduced image and the cropped image so that a user can visually confirm a full view of the first image and the each of the objects identified as the target object in the cropped image.

20. A non-transitory computer-readable medium storing instructions which when executed by a computer cause the computer to perform a method of an information processing apparatus for identifying a target object, the method comprising:
- generating or receiving a first image of a sequence of images including a plurality of objects;
- determining for each of the objects a length of time during which a movement of an object is below a predetermined movement threshold;
- identifying the object as the target object based on the determined length of time during which the movement of the object is below the predetermined movement threshold;
- generating a reduced image from the first image by lowering a resolution of the first image, wherein the target object in the reduced image is less visually recognizable than the target object in the first image;
- generating a cropped image from the first image by cropping the first image by cropping each of the objects identified as the target object, the cropped image having the lowered resolution of the first image; and
- displaying the reduced image and the cropped image so that a user can visually confirm a full view of the first image and the each of the objects identified as the target object in the cropped image.

* * * * *